US008085227B2

(12) United States Patent

Ezaki et al.

(10) Patent No.: US 8,085,227 B2

(45) Date of Patent: Dec. 27, 2011

(54) CONTROL DEVICE, ILLUMINATION DEVICE, AND DISPLAY DEVICE

(75) Inventors: Go Ezaki, Kyoto (JP); Toru Yagi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1015 days.

(21) Appl. No.: 12/015,924

(22) Filed: Jan. 17, 2008

(65) Prior Publication Data

US 2008/0174545 A1 Jul. 24, 2008

(30) Foreign Application Priority Data

Jan. 19, 2007 (JP) ................................ 2007-010405

(51) Int. Cl.

*G09G 3/32* (2006.01)
*G09G 3/36* (2006.01)
*G09G 5/00* (2006.01)
*G06F 3/038* (2006.01)

(52) U.S. Cl. .......................... 345/82; 345/102; 345/204

(58) Field of Classification Search .................... 345/82, 345/102, 204

See application file for complete search history.

(56) References Cited

U.S. PATENT DOCUMENTS 7,864,144 B2 * 1/2011 Yagi ................................ 345/82

FOREIGN PATENT DOCUMENTS

JP 2002-335234 11/2002

* cited by examiner

*Primary Examiner* — Bipin Shalwala
*Assistant Examiner* — Ilana Spar
(74) *Attorney, Agent, or Firm* — Fish & Richardson P.C.

(57) ABSTRACT

A control device has: an external terminal receiving a control signal; an output setting circuit changing an output state every time a predetermined edge appears in the control signal; an oscillator generating a clock signal; a period detector counting the number of pulses in the clock signal to detect whether or not the control signal has been kept at a predetermined logic level for a predetermined period; an initializing circuit initializing, based on the output of the period detector, the output state specified by the output setting circuit when the control signal is found to have been kept at the predetermined logic level for the predetermined period; and an oscillation control circuit permitting the operation of the oscillator only when the control signal is at the predetermined logic level and inhibiting the operation of the oscillator otherwise.

3 Claims, 4 Drawing Sheets

CONTROL DEVICE, ILLUMINATION DEVICE, AND DISPLAY DEVICE

This application is based on Japanese Patent Application No. 2007-010405 filed on Jan. 19, 2007, the contents of which are hereby incorporated by reference.

BACKGROUND OF THE INVENTION

1. Field of the Invention

The present invention relates to a control device that changes its output state according to a control signal. The present invention also relates to a control device such as an LED (light emitting diode) driver IC for supplying a predetermined drive current to a light emitting element, and to an illumination device and a display device incorporating such a control device.

2. Description of Related Art

A conventional light emission control device for supplying a drive current to a light emitting element such as an LED typically employs a two- or more-line interface as a control interface so that, as commands such as those requesting writes to a register are transmitted to the light emission control device, its turning on/off and light emission amount (drive current level) are controlled.

A conventional technology related to the present invention is, for example, "a single-line serial data transfer method and a data transfer interface circuit employing it" disclosed in JP-A-2002-335234 (hereinafter Patent Publication 1).

Certainly, with conventional light emission control devices described above, it is possible to control their turning on/off and light emission amount (drive current level) according to various control signals fed from outside the device.

Inconveniently, however, with the conventional light emission control devices described above, the control signal needed to control their turning on/off and the control signal needed to control their light emission amount (drive current level) are fed in via separate control interfaces. This complicates the control and also requires an increased number of external terminals, leading to an increased size and cost of light emission control devices (and hence of display devices employing them).

Incidentally, there have been proposed various system control technologies employing a single-line interface, like the single-line serial data transfer method disclosed in Patent Publication 1. Any of these conventional technologies, however, differs in essence from the present invention described herein.

SUMMARY OF THE INVENTION

An object of the present invention is to provide a control device whose output state control (e.g., turning on/off of a drive current to be supplied to a load and current value control) can be performed using a single-line interface, and to provide an illumination device and a display device incorporating such a control device.

To achieve the above object, according to the present invention, a control device includes: an external terminal receiving a control signal; an output setting circuit changing an output state every time a predetermined edge appears in the control signal; an oscillator generating a clock signal; a period detector counting the number of pulses in the clock signal to detect whether or not the control signal has been kept at a predetermined logic level for a predetermined period; an initializing circuit initializing, based on the output of the period detector, the output state specified by the output setting circuit when the control signal is found to have been kept at the predetermined logic level for the predetermined period; and an oscillation control circuit permitting operation of the oscillator only when the control signal is at the predetermined logic level and inhibiting the operation of the oscillator otherwise.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
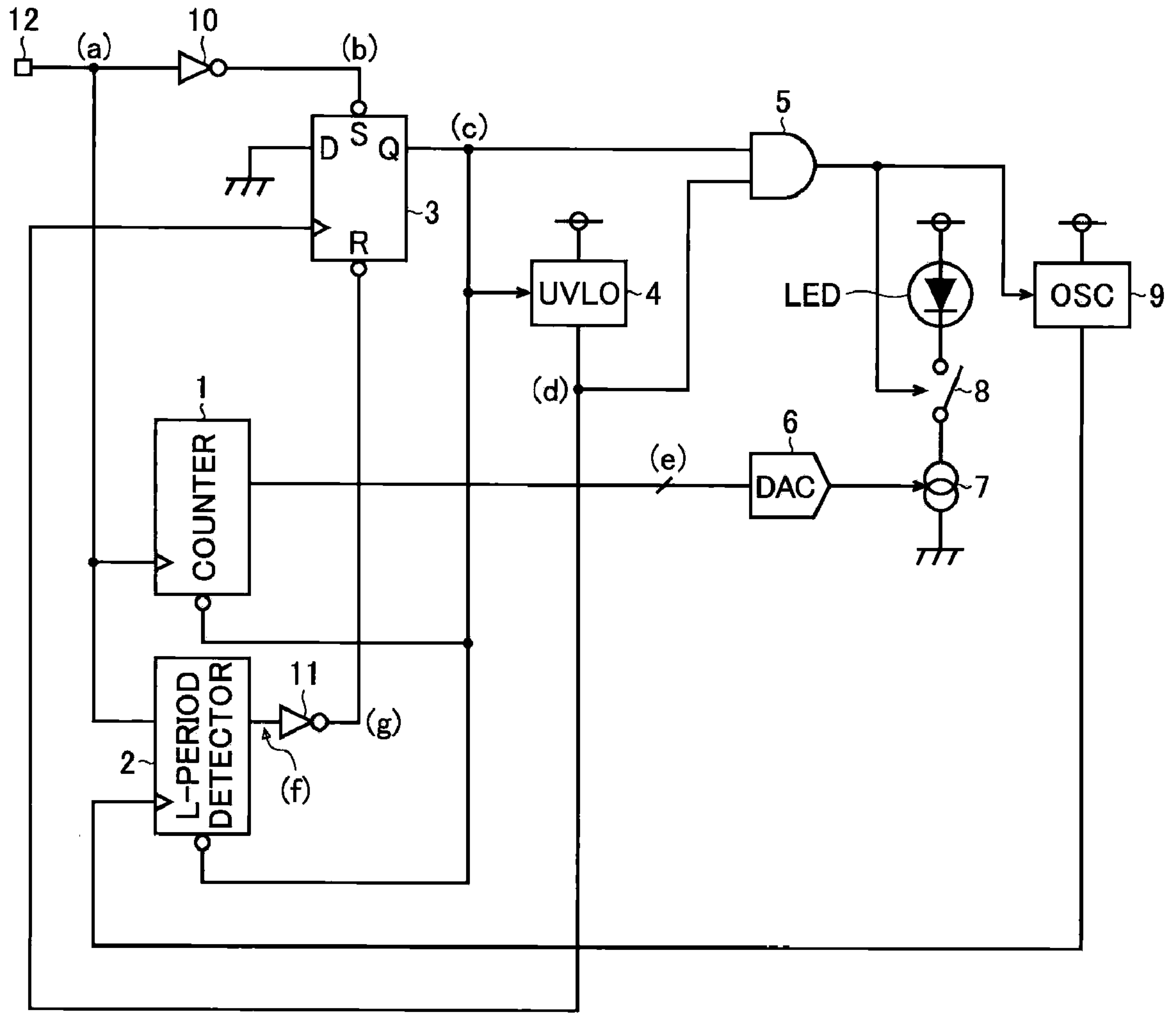
FIG. 1 is a block diagram showing a first embodiment of a display device of the present invention.

FIG. 1 is a block diagram showing a first embodiment of a display device (in particular its part around a light emission control device it incorporates) of the present invention.

In this embodiment, the display device has an illumination device (i.e., a backlight) that illuminates an unillustrated liquid crystal panel from behind including: a light-emitting diode (hereinafter "LED") serving as a light source; and a light emission control device that supplies drive current to the LED. Here, the light emission control device is built as a semiconductor integrated circuit device (a so-called LED driver IC), and includes: a counter 1; a low-level period detector 2; an on/off controller 3; a voltage detector 4 (hereinafter "UVLO section 4", UVLO standing for "undervoltage lockout") for performing undervoltage lockout operation; an AND operator 5; a digital/analog converter 6 (hereinafter "DAC 6"); a variable current source 7; a switch 8; an oscillator 9; inverters 10 and 11; and an external terminal 12.

The counter 1 is triggered by every rising edge in an enable signal "a" fed in via the external terminal 12, i.e., every time the enable signal "a" turns high (enabled), to count the number of pulses in it, and outputs the count as digital data "e". The counter 1 receives, at its reset terminal, an output signal "c" of the on/off controller 3 so that, when the logic level of the output signal "c" becomes low, the counter 1 initializes the number of pulses (resets to zero).

The low-level period detector 2 turns the logic level of its output signal "f" high when the enable signal "a" has been kept low (disabled) for a predetermined period (in this embodiment, 512 μs); otherwise, the low-level period detector 2 keeps the logic level of its output signal "f" low. Like the counter 1, the low-level period detector 2 receives, at its reset terminal, the output signal "c" of the on/off controller 3 so that, when the logic level of the output signal "c" becomes low, the low-level period detector 2 initializes its detection state (resets to low level).

The on/off controller 3 is a D flip-flop that receives: at its data terminal D, a signal whose logic level is low; at its set terminal S, an inverted enable signal "b"; at its reset terminal R, an inverted output signal "g" of the low-level period detector 2; and, at its clock terminal, an output signal "d" of the UVLO section 4. The on/off controller 3 outputs data (i.e., a low level output) at its output terminal Q when triggered by a rising edge in the output signal "d" of the UVLO section 4, i.e., when the output signal "d" turns high. Whenever the logic level of the inverted enable signal "b" fed to its set terminal S is low, the on/off controller 3 keeps its output signal "c" set high, irrespective of the output signal "d" of the UVLO section 4. When the logic level of the inverted output signal "g" of the low-level period detector 2 fed to its reset terminal R becomes low, the on/off controller 3 initializes its output signal "c" (i.e., resets it to low), irrespective of the output signal "d" of the UVLO section 4.

The UVLO section 4 turns the logic level of its output signal "d" high when the power supply voltage to the light emission control device has reached a predetermined voltage level; otherwise, the UVLO section 4 keeps the logic level of its output signal "d" low. The UVLO section 4 receives, at its enable terminal, the output signal "c" of the on/off controller 3 so that, so long as the logic level of the output signal "c" is high, the UVLO section 4 monitors the power supply voltage.

The AND operator 5 performs an AND operation of the output signal "c" of the on/off controller 3 and the output signal "d" of the UVLO section 4; that is, the output logic level of the AND operator 5 is high only when the output signals "c" and "d" are both high, and is low otherwise.

The DAC 6 converts the digital data "e" fed from the counter 1 into analog data, and outputs the analog data.

The variable current source 7 generates a drive current whose level is based on the analog data fed from the DAC 6, and supplies the drive current to the LED.

The switch 8 controls whether or not to supply the drive current to the LED according to the output signal of the AND operator 5. Specifically, in this embodiment, the switch 8 is serially connected in the current path connecting the variable current source 7 to the LED; when the output logic level of the AND operator 5 is high, the switch 8 is on, and, when the output logic level of the AND operator 5 is low, the switch 8 is off.

The oscillator 9 generates a clock signal of a predetermined frequency (in this embodiment, 1 MHz). The clock signal generated by the oscillator 9 is fed to the low-level period detector 2, which uses the clock signal to detect whether or not the enable signal "a" has been kept low for a predetermined period. The oscillator 9 receives, at its enable terminal, the output signal of the AND operator 5 so that, while the logic level of this signal is high, the oscillator 9 operates.

The inverter 10 inverts the logic level of the enable signal "a" to generate the inverted enable signal "b" to feed it to the set terminal S of the on/off controller 3.

The inverter 11 inverts the logic level of the output signal "f" of the low-level period detector 2 to generate the inverted output signal "g" to feed it to the reset terminal R of the on/off controller 3.

The external terminal 12 is a single-line interface terminal via which the enable signal "a" is fed in from outside the device. The enable signal "a" is a binary signal, being either high or low at a time.

Now, with reference to FIG. 2, the operation of the light emission control device configured as described above will be described in detail.

Figure 2:
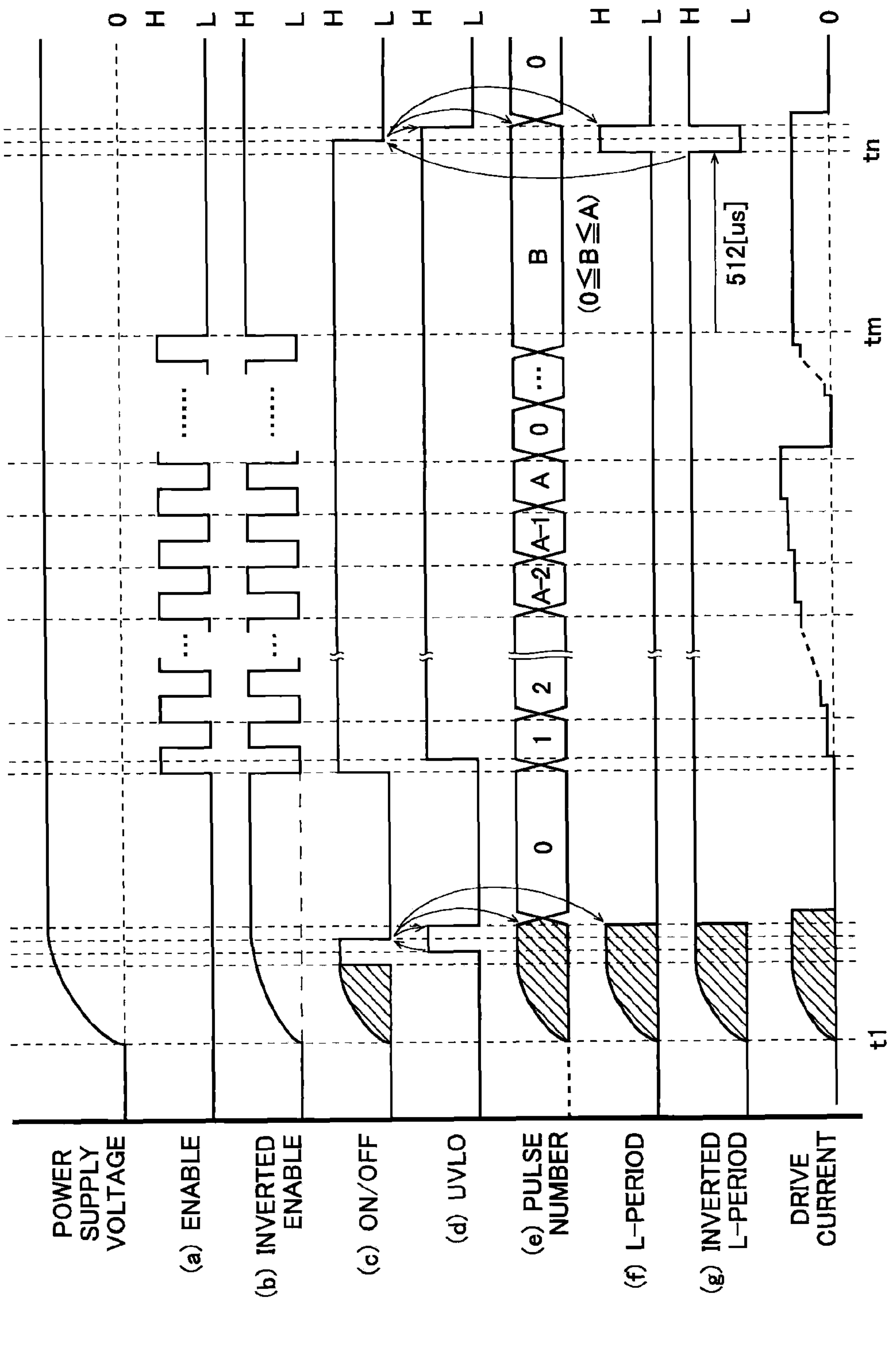
FIG. 2 is a timing chart illustrating how light emission is controlled via a single line.

FIG. 2 is a timing chart illustrating how light emission is controlled with a single-line interface. The symbols "a" to "g" in this figure respectively indicate the signals (or data) "a" to "g" at relevant points in the device shown in FIG. 1.

First, a description will be given of how the level of the drive current is controlled according to the number of pulses in the enable signal "a".

As shown in the figure, in this embodiment, the level of the drive current is controlled in such a manner that the enable signal "a" fed to the light emission control device is pulsated, the counter 1 increments its count "e" by one every time the enable signal "a" turns high, and the DAC 6 receives the count "e" as digital data and converts it into analog data, according to which the variable current source 7 controls the level of the drive current.

For example, in a case where the count "e" is four-bit digital data (0 to 15), when the enable signal "a" is pulsated eight times and then remains high, the LED drive current level is set at "level 8". If the LED drive current level is currently set at its maximum (at "level 15") and then the enable signal "a" is pulsated once more, the count "e" returns to zero, causing the LED drive current level to be set at its minimum (zero).

Next, a description will be given of how resetting is achieved by keeping the enable signal "a" low.

In the light emission control device of this embodiment, as shown in this figure, between time points tm and tn, when the enable signal "a" is kept low (disabled) for a period of 512 μs, the output signal "f" of the low-level period detector 2 turns high, and its inverted output signal "g" turns low. As a result, the output signal "c" of the on/off controller 3 is reset to low, causing the UVLO section 4 to stop operating; moreover, the number of pulses counted by the counter 1 and the detection state of the low-level period detector 2 are initialized (i.e., their outputs are reset to zero and to low, respectively). In this way, in the light emission control device of this embodiment, only when the enable signal "a" has been kept low for a period of 512 μs, it is recognized to have become disabled.

As described above, the light emission control device of this embodiment includes: a drive current level controller (mainly the counter 1, the DAC 6, and the variable current source 7) that controls the level of the drive current to be supplied to the LED according to the number of pulses in the enable signal "a"; and a resetter (mainly the low-level period detector 2 and the on/off controller 3) that resets the device when the enable signal "a" has been kept low for a predetermined period.

With this configuration where the level of the drive current for the LED is controlled through code setting by the DAC 6 according to the number of pulses in the enable signal "a" and where the device as a whole is turned on/off according to the length of the period for which the enable signal "a" remains low, it is possible to feed the device with, as a control signal fed from outside it, only the enable signal "a" and hence via a single line. This helps reduce the number of external terminals, contributing to a reduced size and cost of the light emission control device (and hence the display device incorporating it).

Next, a description will be given of initial resetting at start-up.

As indicated by hatching starting at time point t1 in FIG. 2, when electric power starts to be fed to the device, the logic levels of the output signal "c" of the on/off controller 3, the digital data "e" of the counter 1, the output signal "f" of the low-level period detector 2, and its inverted output signal "g" are indefinite for a while, during which time the different parts of the device start to operate.

In this state of indefinite logic levels, as shown in this figure, even though the enable signal "a" is low (disabled), the output signal "c" of the on/off controller 3 may unintendedly turn high, and the digital data "e" of the counter 1 may not necessarily be zero. Thus, in the state of indefinite logic levels, once the power supply voltage rises to a predetermined voltage, as soon as the output signal "d" of the UVLO section 4 turns high, a drive current may unintendedly be supplied to the LED, causing it to emit light when supposed not to.

Commonly, this state of indefinite logic levels is overcome by using the enable signal "a" as a reset signal of the device.

In the light emission control device of this embodiment, however, since the enable signal "a" is pulsated as described previously so as to control the level of the drive current, it cannot be used intact as a reset signal.

Instead, in the light emission control device of this embodiment, in the state of indefinite logic levels, when the power supply voltage rises to a predetermined voltage level, and then the output signal "d" of the UVLO section 4 turns high, the rising edge in this output signal "d" triggers the on/off controller 3 to cause it to output data (i.e., a low level output). The data output operation acts as the initialization (initial resetting) of the output signal "c"; thus, when the output signal "c" turns low, the UVLO section 4 stops operating, and moreover the pulse count of the counter 1 and the detection state of the low-level period detector 2 are initialized (their outputs are reset to zero and to low, respectively). Meanwhile, the inverted enable signal "b" fed to the set terminal S of the on/off controller 3 is kept high to allow the just mentioned data output operation to take place unhampered.

After the power supply voltage has sufficiently risen, as the enable signal "a" turns high, the output signal "c" of the on/off controller 3 turns high, and the output signal "d" of the UVLO section 4 turns high. This time, however, the on/off controller 3 is not triggered by the rising edge in this output signal "d" to output data (i.e., a low level output). This is because, at this point, the inverted enable signal "b" fed to the set terminal S of the on/off controller 3 is low, and thus the on/off controller 3 is in a set state. Consequently, the data output operation is inhibited, and thus the logic state of the output signal "c" is kept high.

As described above, the light emission control device of this embodiment includes a resetter (mainly the on/off controller 3 and the UVLO section 4) that resets the device if, when the power supply voltage has reached a predetermined voltage level, the enable signal "a" is low (disabled).

With this configuration, the device can surely be reset without the need for a reset terminal. This helps prevent unintended light emission at start-up.

Incidentally, in the state of indefinite logic levels at start-up, there is a delay, attributable to circuit operation, after the output signal "d" of the UVLO section 4 turns high until the output signal "c" of the on/off controller 3 is reset to low. Since this delay is so short (several nanoseconds) that, during this delay period, neither the DAC 6 nor the variable current source 7 can completely start up; thus, the delay does not cause unintended light emission by the LED.

In this figure, to simplify the illustration, the resetting mentioned above is described as taking place when the power supply voltage has almost completely risen; in practice, however, the resetting is performed while the power supply voltage is lower (as soon as the device becomes ready to operate).

In the light emission control device of this embodiment, an existing UVLO section 4 is utilized to monitor the power supply voltage. With this configuration where the output signal "d" of the UVLO section 4, which signal is originally intended to be used to protect the device in an abnormally low-voltage condition (i.e., a shut-down control signal), is also used to perform initial resetting as described above, it is possible to avoid an unnecessary increase in the circuit scale, and this contributes to a reduced size and cost of the light emission control device (and hence the display device incorporating it).

As described above, the light emission control device of the first embodiment can control its output state (specifically, on/off control of the drive current supplied to the LED and current level control) using a single-line interface.

Incidentally, when a charge pump is provided in the light emission control device to generate the drive voltage of the LED, the clock signal of the oscillator 9 can be utilized as a clock signal for driving the charge pump. In this case, the oscillator 9 needs to keep operating not only while the low level of the enable signal "a" is detected but also while the light emission control device is on.

In contrast, in the case where no charge pump is provided, the clock signal generated by the oscillator 9 is necessary only for detecting the low level period of the enable signal "a", and hence the oscillator 9 does not need to operate while the light emission control device is on.

Thus, a detailed description will be given below, with reference to FIGS. 3 and 4, of a technology for appropriately controlling the operation of the oscillator 9 according to the operation state of the light emission control device.

Figure 3:
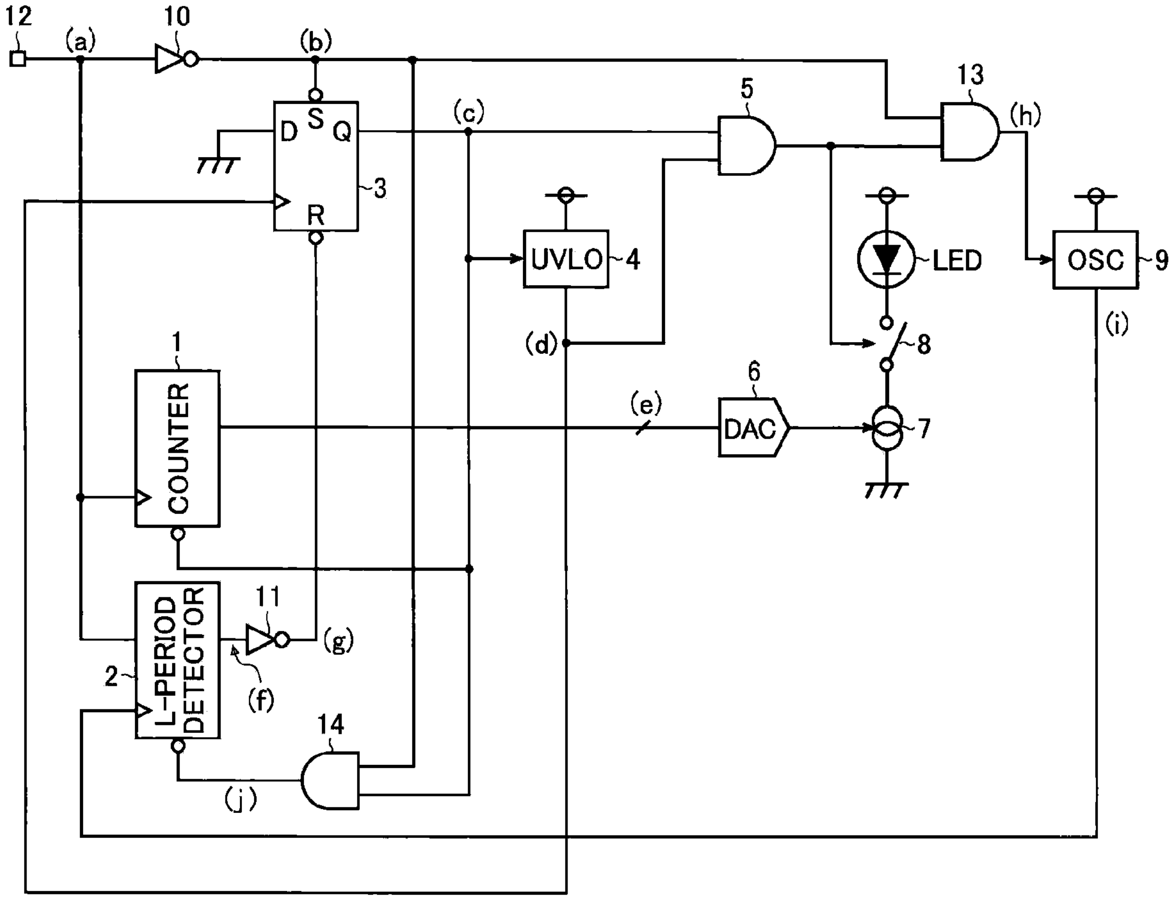
FIG. 3 is a block diagram showing a second embodiment of the display device of the present invention.
Figure 4:
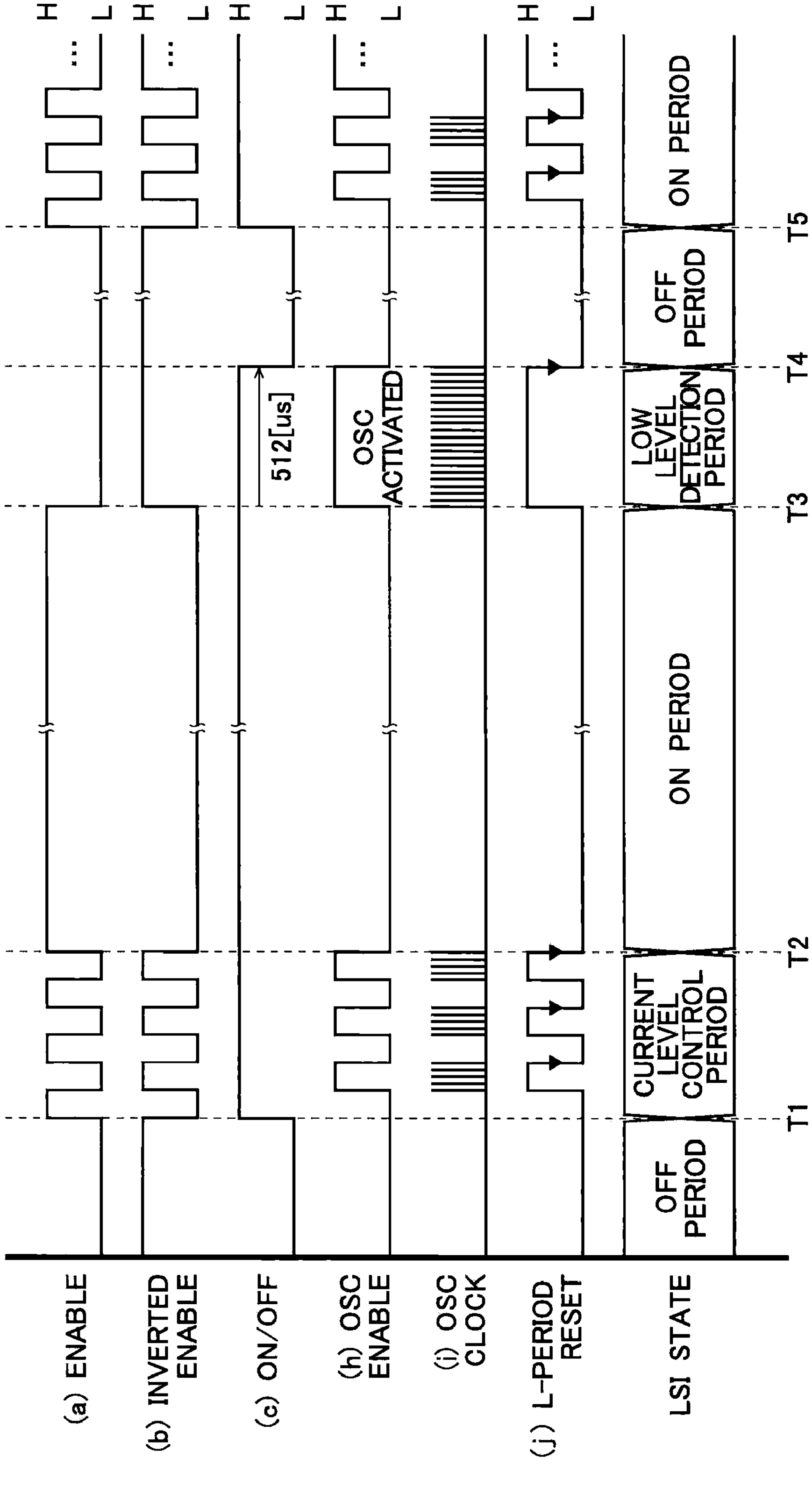
FIG. 4 is a timing chart illustrating how oscillation is controlled.

FIG. 3 is a block diagram showing a second embodiment of the display device of the present invention (in particular its part around a light emission control device it incorporates), and FIG. 4 is a timing chart illustrating how oscillation is controlled. The symbols "a" to "c" and "h" to "j" in FIG. 4 respectively indicate the signals "a" to "c" and "h" to "j" at relevant points in the device shown in FIG. 3.

As shown in FIG. 3, the display device of this embodiment is configured almost in the same manner as the above described first embodiment except for the feature that it further includes AND operators 13 and 14. Thus, the same components as those of the first embodiment are given the same symbols and overlapping description will be omitted to focus on the feature of this embodiment.

One input terminal of the AND operator 13 is connected to an output terminal (a terminal to which the inverted enable signal "b" is applied) of the inverter 10. The other input terminal of the AND operator 13 is connected to an output terminal of the AND operator 5. Incidentally, an output signal "h" of the AND operator 13 is fed to the enable terminal of the oscillator 9, which oscillates when the logic level of the output signal "h" is high.

That is, the AND operator 13 functions such that it gates a normal activation path of the oscillator 9 (a signal path from the AND operator 5 to the oscillator 9) by use of the inverted enable signal "b" to permit the operation of the oscillator 9 only when the output signal "c" of the on/off controller 3 (and hence the output signal of the AND operator 5) is high level and the enable signal "a" is low level (and hence the inverted enable signal "b" is high level) and to inhibit the operation of the oscillator 9 otherwise (see between time points T1 and T4 in FIG. 4).

As mentioned in the above description of the first embodiment, the oscillator 9 is made to stop its operation based on the output signal "c" of the on/off controller 3 (and hence the output signal of the AND operator 5) when the logic level of the enable signal "a" is found to have been kept low for a predetermined period (see between time points T4 and T5 in FIG. 4).

With this configuration, since the operation of the oscillator 9 can be kept off while the light emission control device is on (i.e., while the enable signal "a" is high), circuit current consumption can be reduced, and longer life of batteries used in mobile appliances can be achieved.

One input terminal of the AND operator 14 is connected to the output terminal (the terminal to which the inverted enable signal "b" is applied) of the inverter 10. The other input terminal of the AND operator 14 is connected to an output terminal (a terminal to which the output signal "c" is applied) of the on/off controller 3. Incidentally, an output signal "j" of the AND operator 13 is fed to a reset terminal of the low-level period detector 2, whose detection state is initialized (i.e., reset to low level) when the logic level of the output signal "j" becomes low.

That is, in the light emission control device of this embodiment, the count of the low-level period detector 2 is reset not only every time a falling edge appears in the output signal "c" of the on/off controller 3 but also every time a falling edge appears in the inverted enable signal "b" (i.e., a rising edge appears in the enable signal "a") (see between time points T1 and T2 in FIG. 4).

With this configuration, even if, when the current level of the drive current is controlled based on the number of pulses in the enable signal "a" (between time points T1 and T2 in FIG. 4), the enable signal "a" turns low to make the oscillator 9 operate and the low-level counter 2 further counts up, the low-level detection operation continues to take place unhampered (see between time points T3 and T4 in FIG. 4), because the count is reset as soon as the enable signal "a" turns high.

The embodiment described above deals with a configuration in which a light emission control device of the present invention is used as a light emission controller of an illumination device (a backlight) incorporated in a display device; however, this is not meant to limit the configuration of the present invention in any manner, and the configuration of the present invention can be widely applied to other control devices such as motor drive devices.

The present invention may be carried out with any configuration other than specifically described above as an embodiment, and permits any variations and modifications within the spirit thereof. For example, how the signals "a" to "g" change their logic levels in the embodiment described above is merely an example taken up for illustrating purposes; they may behave in any other manner so long as they achieve similar operation.

Instead of varying the current level, the period for which current is supplied may be varied to achieve PMW driving.

The embodiment described above deals with a configuration in which, in controlling the current level of the drive current, the current level of the drive current is incremented from an initial current level, which is the minimum, according to the number of pulses in the enable signal "a". This, however, is not meant to limit the configuration of the present invention in any manner, and a configuration is acceptable in which an inversion output type DAC 6 is adopted and the current level of the drive current is decremented from an initial current level, which is the maximum, according to the number of pulses in the enable signal "a".

From the perspective of advantages of the present invention, since the control device according to the present invention can control its output state (specifically, on/off control of a drive current fed to a load and current level control) using a single-line interface, it contributes to achieve a more compact control device (and thus a more compact illumination device and display device incorporating the) and reduced cost.

From the perspective of industrial applicability, the invention is useful in reducing the number of external terminals of a light emission control device (and hence in reducing its size and cost). For example, a light emission control device according to the invention can be employed to control light emission in a display device in which slimness is sought.

While the present invention has been described with respect to preferred embodiment, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A control device supplying a drive current to a light emitting element, comprising:

an external terminal receiving a binary enable signal;

a counter counting a number of pulses by being triggered by an edge in the enable signal which appears when the enable signal turns from a second logic level to a first logic level, the counter outputting a resulting count as digital data;

a digital/analog converter converting the digital data into analog data and outputting the analog data;

a current source generating a drive current whose current level is based on the analog data, the current source supplying the drive current to the light-emitting element;

an oscillator generating a clock signal;

a period detector counting a number of pulses in the clock signal to detect whether or not the enable signal has been kept at the second logic level for a predetermined period;

a voltage detector detecting whether or not a power supply voltage has reached a predetermined voltage level;

an on/off controller formed of a D flip-flop receiving at a data terminal thereof a logic signal in the second logic level, receiving at a set terminal thereof an inverted signal of the enable signal, receiving at a reset terminal thereof an output signal of the period detector, and receiving at a clock terminal thereof an output signal of the voltage detector;

a first AND operator performing an AND operation of an output signal of the on/off controller and the output signal of the voltage detector;

a switch controlling whether or not to supply a drive current to the light-emitting element based on an output signal of the first AND operator, a second AND operator performing an AND operation of the inverted signal of the enable signal and an output signal of the first AND operator; and a third AND operator performing an AND operation of the inverted signal of the enable signal and the output signal of the on/off controller, wherein a reset terminal of the counter and an enable terminal of the voltage detector each receive the output signal of the on/off controller, an enable terminal of the oscillator receives the output signal of the second AND operator, and a reset terminal of the period detector receives an output signal of the third AND operator.

2. An illumination device, comprising:

a light emitting element serving as a light source; and a light emission control device supplying a drive current to the light emitting element, wherein the light emission control device includes:

an external terminal receiving a binary enable signal;

a counter counting a number of pulses by being triggered by an edge in the enable signal which appears when the enable signal turns from a second logic level to a first logic level, the counter outputting a resulting count as digital data;

a digital/analog converter converting the digital data into analog data and outputting the analog data;

a current source generating a drive current whose current level is based on the analog data, the current source supplying the drive current to the light-emitting element;
an oscillator generating a clock signal;
a period detector counting a number of pulses in the clock signal to detect whether or not the enable signal has been kept at the second logic level for a predetermined period;
a voltage detector detecting whether or not a power supply voltage has reached a predetermined voltage level;
an on/off controller formed of a D flip-flop receiving at a data terminal thereof a logic signal in the second logic level, receiving at a set terminal thereof an inverted signal of the enable signal, receiving at a reset terminal thereof an output signal of the period detector, and receiving at a clock terminal thereof an output signal of the voltage detector;
a first AND operator performing an AND operation of an output signal of the on/off controller and an output signal of the voltage detector;
a switch controlling whether or not to supply the drive current to the light-emitting element based on an output signal of the first AND operator;
a second AND operator performing an AND operation of the inverted signal of the enable signal and the output signal of the first AND operator; and
a third AND operator performing an AND operation of the inverted signal of the enable signal and the output signal of the on/off controller,
a reset terminal of the counter and an enable terminal of the voltage detector each receive the output signal of the on/off controller,
an enable terminal of the oscillator receives the output signal of the second AND operator, and
a reset terminal of the period detector receives an output signal of the third AND operator.

3. A display device, comprising:
a liquid crystal panel; and
an illumination device illuminating the liquid crystal panel, wherein
the illumination device includes:
a light emitting element serving as a light source;
a light emission control device supplying a drive current to the light emitting element,
the light emission control device includes:
an external terminal receiving a binary enable signal;
a counter counting a number of pulses by being triggered by an edge in the enable signal which appears when the enable signal turns from a second logic level to a first logic level, the counter outputting a resulting count as digital data;
a digital/analog converter converting the digital data into analog data and outputting the analog data;
a current source generating a drive current whose current level is based on the analog data, the current source supplying the drive current to the light-emitting element;
an oscillator generating a clock signal;
a period detector counting a number of pulses in the clock signal to detect whether or not the enable signal has been kept at the second logic level for a predetermined period;
a voltage detector detecting whether or not a power supply voltage has reached a predetermined voltage level;
an on/off controller formed of a D flip-flop receiving at a data terminal thereof a logic signal in the second logic level, receiving at a set terminal thereof an inverted signal of the enable signal, receiving at a reset terminal thereof an output signal of the period detector, and receiving at a clock terminal thereof an output signal of the voltage detector;
a first AND operator performing an AND operation of an output signal of the on/off controller and the output of the voltage detector;
a switch controlling whether or not to supply the drive current to the light-emitting element based on an output signal of the first AND operator;
a second AND operator performing an AND operation of the inverted signal of the enable signal and the output signal of the first AND operator; and
a third AND operator performing an AND operation of the inverted signal of the enable signal and the output signal of the on/off controller,
a reset terminal of the counter and an enable terminal of the voltage detector each receive the output signal of the on/off controller,
an enable terminal of the oscillator receives the output signal of the second AND operator, and
a reset terminal of the period detector receives an output signal of the third AND operator.

* * * * *